United States Patent
Nagasawa et al.

(10) Patent No.: US 7,967,492 B2
(45) Date of Patent: Jun. 28, 2011

(54) LIGHT DIFFUSION FILM AND PLANAR LIGHT SOURCE ELEMENT AND LIQUID CRYSTAL DISPLAY DEVICE UTILIZING THE SAME

(75) Inventors: Atsushi Nagasawa, Tsukuba (JP); Yasuyuki Sanai, Nagoya (JP)

(73) Assignees: Kuraray Co., Ltd., Kurashiki-shi (JP); Toagosei Co., Ltd., Tokyo (JP)

( * ) Notice: Subject to any disclaimer, the term of this patent is extended or adjusted under 35 U.S.C. 154(b) by 149 days.

(21) Appl. No.: 11/817,162

(22) PCT Filed: Feb. 27, 2006

(86) PCT No.: PCT/JP2006/303603
§ 371 (c)(1),
(2), (4) Date: Feb. 27, 2006

(87) PCT Pub. No.: WO2006/093087
PCT Pub. Date: Sep. 8, 2006

(65) Prior Publication Data
US 2009/0034287 A1 Feb. 5, 2009

(30) Foreign Application Priority Data
Feb. 28, 2005 (JP) ................................. 2005-052718

(51) Int. Cl.
F21V 7/04 (2006.01)
(52) U.S. Cl. .......................... 362/618; 362/606; 362/627
(58) Field of Classification Search ........ 362/97.1–97.2, 362/97.4, 330, 606–607, 626–627, 629
See application file for complete search history.

(56) References Cited

U.S. PATENT DOCUMENTS

| | | | |
|---|---|---|---|
| 5,396,350 A | 3/1995 | Besson et al. | |
| 6,275,338 B1 | 8/2001 | Arai et al. | |
| 6,577,358 B1 | 6/2003 | Arakawa et al. | |
| 7,213,936 B2 * | 5/2007 | Wang et al. | 362/223 |
| 2004/0047163 A1 | 3/2004 | Harada et al. | |
| 2005/0207137 A1 * | 9/2005 | Nishikawa et al. | 362/84 |

FOREIGN PATENT DOCUMENTS

JP 2 221925 9/1990
(Continued)

OTHER PUBLICATIONS

Extended Search Report issued Sep. 23, 2010 in European Application No. 06714740.5.

(Continued)

Primary Examiner — Jason Moon Han
(74) Attorney, Agent, or Firm — Oblon, Spivak, McClelland, Maier & Neustadt, L.L.P.

(57) ABSTRACT

To provide a light diffusion film that contributes lightweight with reduction in thickness, a planar light source element utilizing the light diffusion film, and a liquid crystal display device utilizing the light diffusion film and/or the planar light source element. A light diffusion film (25) having a plurality of projections (23) of a specific shape is at least partly formed from a composition containing a mixture of a photocurable compound and a particulate material. A light guide plate (22), provided with one or more light sources (21) at one side face thereof, is bonded to vertexes of the projections (23) to provide a planar light source element, which is thin and lightweight and capable of emitting non-glaring light uniformly from the entire surface thereof.

16 Claims, 1 Drawing Sheet

FOREIGN PATENT DOCUMENTS

| | | |
|---|---|---|
| JP | 4 145485 | 5/1992 |
| JP | 11 144515 | 5/1999 |
| JP | 2001 133605 | 5/2001 |
| JP | 2001 338507 | 12/2001 |
| WO | WO 2005/006030 A1 | 1/2005 |

OTHER PUBLICATIONS

Notification of Reasons for Rejection issued Mar. 22, 2011 in corresponding Japanese Patent Application No. 2007-505919 (w/English Translation).

* cited by examiner

LIGHT DIFFUSION FILM AND PLANAR LIGHT SOURCE ELEMENT AND LIQUID CRYSTAL DISPLAY DEVICE UTILIZING THE SAME

FIELD OF THE INVENTION

The present invention relates to a light diffusion film applicable to a mobile phone, a personal digital assistant (PDA), a video camera, an automobile navigation system, a laptop computer, a computer display, a television, a billboard or the like, and also to a planar light source element and a liquid crystal display device utilizing the same.

BACKGROUND ART

The liquid crystal display device, which has now come to be largely employed in the small size display device such as, for example, a mobile phone, a PDA or a video camera, or the medium-to-large size display device such as, for example, an automobile navigation system, a laptop computer, a computer display, a television or a billboard is generally made up of a planar light source element (a back light source) for emitting rays of light in a planar configuration, in combination with a liquid crystal display panel for providing a visual presentation of information. The liquid crystal display device is so designed that images of alphanumerical characters and/or pictures can be displayed by selectively controlling the light transmissivity of the liquid crystal display panel in response to applied audio/video signals.

The structure of the standard planar light source element 10 is shown in FIG. 3. Rays of light emitted from a light source 11 such as, for example, a cold cathode flourescent lamp or a light emitting diode (LED) income upon and then propagate within a light guide plate 12, made of a transparent material such as, for example, a polymethyl methacrylate or a cycloolefinic polymer. The light guide plate 12 has a rear surface provided with a rear surface treated pattern 13 including, for example, a pattern of dot or a micro-pattern. The rays of light propagating within the light guide plate 12 and subsequently incoming upon the rear surface treated pattern 13 are diffused and emerge outwardly from the light guide plate 12. Since the rays of light emerging outwardly from the light guide plate 12 are omnidirectional, the use is generally made of both a light diffusion film 14 and a plurality of prism sheets 15 so that the rays of light can be collimated to travel forwardly with an increased brightness. As shown in FIG. 3 the standard planar light source element includes one light diffusion film 14 and two prism sheets 15 having respective lenslets laid perpendicular to each other. The planar light source element also includes a light reflecting sheet 16 such as, for example, a film or a foamed polyethylene terephthalate, having a metal vapor deposited thereon, which is disposed adjacent to the rear surface of the light guide plate 12. Thereby, the rays of light emitted rearwardly of the light guide plate 12 can be returned to the light guide plate 12 by such a reflecting sheet 16.

The light diffusion film of the planar light source element of the structure referred to above does not only collimate omnidirectional rays of light in a direction forwardly thereof, but also serves to improve the uniformity of the planar light distribution, as well as to suppress glare of the planar light source element, that is, garish shining of a portion of the surface of the planar light source element. Accordingly, it has been generally considered difficult to realize the planar light source element of a structure without light diffusion film employed.

In contrast thereto, as the liquid crystal display devices have come to be largely employed, demands have been correspondingly increasing for reduction in thickness and weight, and this is particularly true of the liquid crystal display devices for use with such portable equipments as, for example, mobile phones, PDAs and video cameras. In view of this trend, as a method of realizing the reduction in thickness and weight of the planar light source element, U.S. Pat. No. 5,396,350 and the Japanese Laid-open Patent Publication No. 11-144515, for example, suggest to add the function of a prism sheet for controlling the angular distribution of light emission to the light guide plate, and this method has proven effective to a certain extent although the resultant planar light source element requires an extra use of a light diffusion film for diffusing the incoming rays of light.

Also, the Japanese Laid-open Patent Publication No. 2001-338507, for example, discloses lamination of a resin which contains a particulate matter on the outermost layer of the planar light source element, or formation of minute surface indentations on the outermost layer so as to provide the planar light source element with a light diffusing functionality. According to this known technique, the number of component parts can be reduced because it is possible for the planar light source element to be added with a function afforded by the prism sheet or the light diffusion film. However, it has been found difficult to essentially accomplish reduction in thickness because refraction and scattering of light relying on the surface contour of the planar light source element are utilized.

On the other hand, the Japanese Laid-open Patent Publications No. 2-221925 and No. 4-145485, for example, disclose addition of particulate matter to the light guide plate so that the light guide plate can have a function of the light diffusion film. However, the planar light source element disclosed therein has a problem in that the prism sheet must necessarily be employed in order to achieve the uniformity of the planar light distribution of light emission and the desired light emitting angle.

DISCLOSURE OF THE INVENTION

In view of the foregoing, the present invention has been devised to substantially eliminate the foregoing problems and inconveniences inherent in the conventional art and is intended to provide a light diffusion film capable of contributing to reduction in thickness and weight, a planar light source element of a kind utilizing such light diffusion film, and a liquid crystal display device utilizing one or both of such light diffusion film and such planar light source element.

In order to accomplish the foregoing objects, the present invention provides a light diffusion film including a sheet body having a first major surface on a light incident side and a second major surface on a light emissive side, and a plurality of projections protruding outwardly from the first major surface of the sheet body. The projections have inclined surfaces relative to the first major surface of the sheet body and vertexes lying on the same plane with each other. Rays of light incident on the vertexes of the projections are reflected by the inclined surfaces of the projections and then emerge outwardly from the second major surface of the sheet body, which is opposite to the first major surface having the projections formed thereon. At least the projections are at least partially formed from a particulate-matter-mixed composition including a photocurable compound and a particulate matter.

According to the present invention, by forming the projections of the light diffusion film from the particulate-mattermixed composition, the rays of light can be effectively scattered within the projections. Further, the particular shape of the projections is effective to allow the scattered rays of light to be collimated in a direction forwardly. Accordingly, only with the light diffusion film, it is possible to collimate the rays of light in the forward direction and also to suppress glaring light emission to thereby improve the uniformity of the planar light distribution. Therefore, the light diffusion film of the present invention does not require the use of a plurality of prism sheets and a conventional light diffusion film, which have been required in the conventional art. That is to say, in the present invention, the light diffusion film by itself can have comparable functions enough to accomplish reduction in thickness and weight of the planar light source element.

Preferably, the difference in refractive index between a cured matter of the photocurable compound and the particulate matter, both contained in the particulate-matter-mixed composition, is within the range of 0.03 to 0.18. Also preferably, the particulate matter has an average particle size within the range of 1 to 10 μm.

The present invention also provides a planar light source element including a light guide plate provided with one or more light sources in a side face thereof, and a light diffusion film of a kind described hereinabove. The light guide plate and the light diffusion film are coupled together with the vertexes of the projections of the light diffusion film bonded to the light guide plate. This planar light source element is effective to collimate the rays of light in the forward direction and also to suppress glaring light emission to thereby improve the uniformity of the planar light distribution. Therefore, the planar light source element of the present invention does not require the use of a plurality of prism sheets and a conventional light diffusion film which have been required in the conventional art. That is to say, only the light diffusion film by itself can have comparable functions enough to accomplish reduction in thickness and weight of the planar light source element.

The present invention furthermore provides a liquid crystal display device utilizing the light diffusion film of the type referred to above and/or the planar light source element of the type referred to above.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
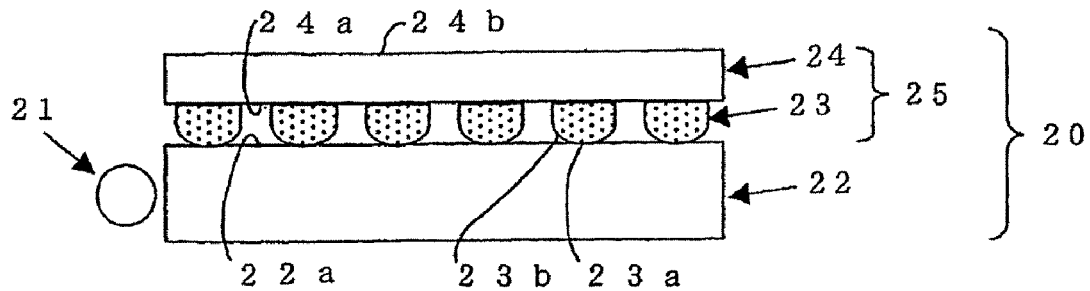
FIG. 1 is a schematic diagram showing a planar light source element according to the present invention.

A preferred embodiment of the present invention will now be described with particular reference to FIGS. 1 to 2b. In particular, FIG. 1 illustrates a schematic diagram showing an example of a planar light source element according to the present invention. This planar light source element 20 includes a light guide plate 22 provided with one or more light sources 21 in a side face thereof, and a light diffusion film 25.

The light diffusion film 25 includes a sheet body 24 having a first major surface 24a on a light incident side, which receives the incoming light, and a second major surface 24b on a light emissive side, from which rays of light emerge outwardly; and a plurality of projections 23 formed on the first major surface 24a of the sheet body 24 so as to protrude outwardly therefrom. Those projections 23 have inclined surfaces 23b relative to the first major surface 24a and also have respective vertexes 23a lying on the same plane. At least the projections 23 of the light diffusion film 25 are made from a particulate-matter-mixed composition prepared by mixing a photocurable compound and a particulate matter. It is to be noted that each of the projections 23 may have any suitable shape provided that at least a portion thereof represents a curved surface, but is preferably of a type having a sectional shape, which is, for example, oval or round. It is also to be noted that the plural projections 23 are arranged in either one dimensional pattern or a two-dimensional pattern.

This planar light source element 20 is completed with a light emissive surface 22a of the light guide plate 22 bonded with the vertexes 23a of the projections 23 of the light diffusion film 25. Rays of light emitted from the light source 21 propagate at no loss while undergoing a total reflection within the light guide plate 22 and are taken out through only joints between the vertexes 23a of the projections 23 and the light emissive surface 22a of the light guide plate 22. The rays of light entering into the vertexes 23a of the projections 23 are scattered within the projections 23 because of the presence of the particulate matter in the projections 23, and are reflected by the inclined surfaces 23b of the projections 23. Thereafter they are emitted outwardly from the second major surface 24b of the light emissive side opposite to the first major surface 24a where the projections 23 are formed.

In the practice of the present invention, since the projections 23 of the light diffusion film 25 are formed from the particulate-matter-mixed composition, the rays of light can be scattered within the projections 23. Further, the particular shape of the projections 23 is effective to allow the scattered rays of light to be collimated in a direction forwardly. Accordingly, with the light diffusion film 25 by itself, it is possible not only to collimate the rays of light in the forward direction but also to suppress glaring light emission to thereby improve the uniformity of the planar light distribution. Also, since distribution of the rays of light emerging outwardly from the light diffusion film 25 can be controlled in terms of the viewing angle by the shapes of the inclined surfaces 23b of the projections 23, there is no need to use any prism sheet such as hitherto required. Thus, without using a plurality of prism sheets and conventional light diffusion film, the light diffusion film can be obtained, which is of a type having comparable functions enough to accomplish reduction in thickness and weight of the planar light source element.

Figure 2A:
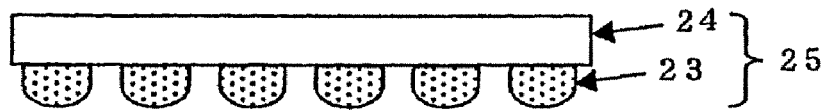
FIG. 2a is a schematic diagram showing an example of a light diffusion film according to the present invention.
Figure 2B:
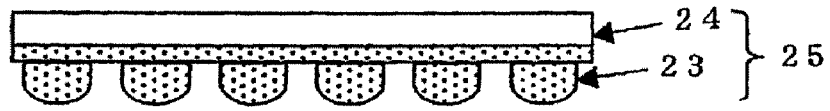
FIG. 2b is a schematic diagram showing another example of the light diffusion film according to the present invention.
Figure 3:
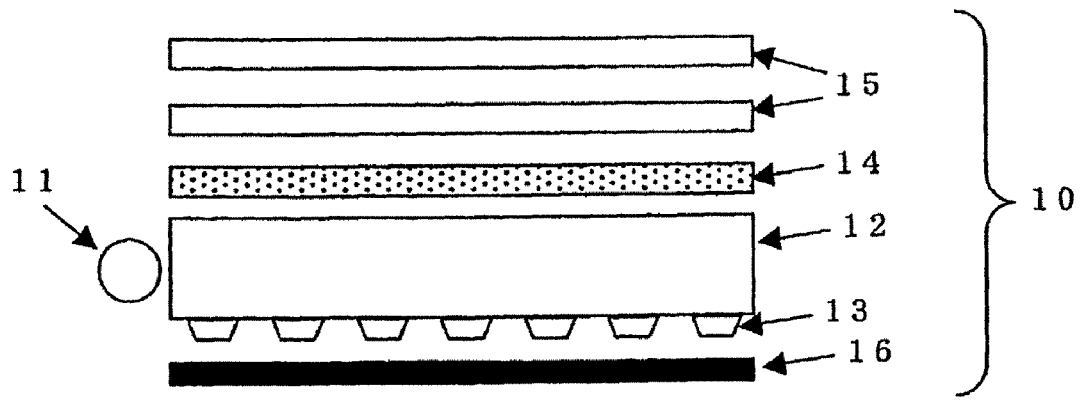
FIG. 3 is a schematic diagram showing an example of the conventional planar light source element.

It is to be noted that the light diffusion film 25 may be of a kind, in which only the projections 23 are formed from the particulate-matter-mixed composition as shown in FIG. 2a or, alternatively, not only the projections 23, but also a flat layer forming a part of the sheet body 24 may be formed from the particulate-matter-mixed composition as shown in FIG. 2b.

With the planar light source element of the present invention, not only can it accomplish respective functions of the conventional prism sheet and light diffusion film, but also it can contribute to reduction in thickness and weight of a liquid crystal display device including a liquid crystal display (LCD) provided on a light emissive surface.

As a material for sheet body (support body) 24 of the light diffusion film 25 of the present invention, there may be employed a film that is transparent in visible region of light, which is made of, for example, a polyester, a polycarbonate, a polyolefin, a polycycloolefin, a polymethyl methacrylate, a polyethersulfone, a cellulose acetate or a polyarylate.

The particulate-matter-mixed composition used to form the projections 23 of the light diffusion film 25 includes a photocurable compound and a particulate matter. The photocurable compound includes a polymerizable monomer and, if desired, another component such as, for example, a photopolymerization initiating agent. The polymerizable monomer referred to above is a photopolymerizable compound and may generally contain a photopolymerizable ethylenically unsaturated compound having at least one ethylenic double bond in its molecules, but may be added with a cationic photopolymerizable compound such as an epoxy-type or an oxetane-type compound If so desired. Examples of the photopolymerizable ethylenically unsaturated compound that can be employed in the practice of the present invention may include monofunctional (meth)acrylic monomers such as, for example, (meth)acrylic acid, methyl (meth)acrylate, ethyl (meth)acrylate, propyl (meth)acrylate, n-butyl (meth)acrylate, t-butyl (meth)acrylate, 2-ethylhexyl (meth)acrylate, benzyl (meth)acrylate, glycidyl (meth)acrylate, tetrahydrofurfuryl (meth)acrylate, and 2-hydroxyethyl (meth)acrylate; vinyl monomers such as, for example, N-vinyl pyrrolidone, N-vinyl imidazole, N-vinyl caprolactam, styrene, α-methylstyrene, vinyl toluene, allyl acetate, vinyl acetate, vinyl propionate, and vinyl benzoate; bifunctional (meth)acrylic monomers such as, for example, 1,4-butanediol di(meth)acrylate, 1,6-hexanediol di(meth)acrylate, 1,9-nonandiol di(meth)acrylate, ethyleneglycol di(meth)acrylate, and a polyethyleneglycol di(meth)acrylate; multifunctional (meth)acrylic monomers such as, for example, trimethylolpropane tri(meth)acrylate, pentaerythritol tri(meth)acrylate, pentaerythritol tetra(meth)acrylate, pentaerythritol penta(meth)acrylate, dipentaerythritol hexa(meth)acrylate, tri(meth)acryloyl cyanurate, tri(meth)acryloyl isocyanurate, triallyl cyanurate, triallyl isocyanurate, and 1,3,5-tri(meth)acryloyl-hexahydro-s-hydrazine; and (meth)acrylic oligomers such as, for example, urethane (meth)acrylate, epoxy (meth)acrylate and a polyester (meth)acrylate. One or more of those enumerated compounds may be employed or, alternatively, a composition of a plurality of those compounds may be employed. It is to be noted that the term "(meth)acrylic acid" used in those nomenclatures is intended to mean either acrylic acid or methacrylic acid; the term "(meth)acrylate" used therein is intended to mean either acrylate or methacrylate; and the term "(meth)acryloyl" is intended to mean either acryloyl or methacryloyl. If desired or required, a photopolymerization initiating agent may be added therein. Examples of the photopolymerization initiating agent may include 2,2-dimethoxy-2-phenylacetone, acetophenone, benzophenone, xanthofluorenone, benzaldehyde, anthraquinone, 1-(4-isopropylphenyl)-2-hydroxy-2-methylpropane-1-on, 1-hydroxy-cyclohexyl-phenyl-ketone, 2,4-diethylthioxanthone, camphorquinone, 2-methyl-1-[4-(methylthio)phenyl]-2-morpholinopropane-1-on and so on.

The particulate matter that can be employed in the practice of the present invention may be an organic compound such as, for example, a methacrylic polymer containing methyl methacrylate as a main component, a styrene-methacrylate copolymer containing methyl methacrylate and styrene as main components, a polystyrene, a polyacrylonitrile, a polyester, a silicone, an epoxy resin or a melamine resin; or an inorganic compound such as, for example, barium sulfate, calcium carbonate, aluminum hydroxide, titanium dioxide, silica, alumina or glass. The particulate matter when used in the practice of the present invention has an average particle size preferably within the range of 1 to 10 μm. If the average particle size of the particulate matter is smaller than the lowermost limit of 1 μm, the particle size too closely approximates the wavelength of the visible light. Thereby the diffused light will exhibit a considerable wavelength dependency to such an extent as to result in an undesirable coloring. On the other hand, if the average particle size is larger than the uppermost limit of 10 μm, the amount of the particulate matter that can be mixed with the photocurable compound will be limited and, therefore, no sufficient light diffusing capability can be obtained.

Also, the difference in refractive index between a cured material of the photocurable compound and the particulate matter is preferably within the range of 0.03 to 0.18. If the difference in refractive index is smaller than the lowermost limit of 0.03, the diffusing capability of the light diffusion film will be lowered and, therefore, in order to secure the desired diffusing capability, the light diffusion film prepared from the particulate-matter-mixed composition must have an increased thickness and this is in contrast to reduction of the thickness for which the present invention is intended. On the other hand, if the difference in refractive index is larger than the uppermost limit of 0.18, the wavelength dependency of the diffusing capability of the film will become considerable to such an extent as to result in red or yellow coloring of the emitted light.

The amount of the particulate matter to be contained in the particulate-matter-mixed composition is not specifically limited in the practice of the present invention. However, the higher is the diffusing capability desired, the more the amount of the particulate matter to be added in the particulate-matter-mixed composition is employed and, conversely, the amount of the particulate matter to be added may be relatively small if no high diffusing capability is desired. Also, provided that the amount of the particulate matter to be added is within the above mentioned specific range, particulate matter of a different characteristic may be mixed therewith. In other words, the particulate matter to be added may be employed in the form of a mixture of the organic particulate matter and the inorganic particulate matter or may be in the form of a mixture of the particulate matter having different particle sizes and/or of a kind, which may result in different refractive indexes.

Hereinafter, the present invention will be demonstrated by way of some examples that are presented only for the sake of illustration, which are not to be construed as limiting the scope of the present invention.

EXAMPLE I

A particulate-matter-mixed composition was prepared by mixing 90 parts by weight of a photocurable compound ("UVX4370", acrylic compound manufactured by and available from Toagosei Co., Ltd. of Japan) and 10 parts by weight of a particulate matter ("TM-X-5" manufactured by and available from Toagosei Co., Ltd. of Japan) prepared from a polymethyl methacrylate (hereinafter referred to as PMMA). Reflective index of a hardened material of the photocurable compound and that of the particulate matter are 1.563 and 1.497, respectively, and the particulate matter represented a spherical shape having a diameter of 5.4 μm.

Subsequently, was prepared a light diffusion film by forming a plurality of projections of a generally semispherical shape having a height of about 20 µm and a width of about 25 µm, in a PMMA film ("Technolloy S001" manufactured by and available from Sumitomo Chemical Co., Ltd. of Japan) of 80×60 mm in size and having a thickness of 0.13 mm. More concretely, the light diffusion film can be obtained by a process described hereinafter. That is, using a nickel stamper having a pattern of indentations that are complemental to the shape of the projections in the eventually formed light diffusion film, the particulate-matter-mixed composition referred to above has been filled in the nickel stamper, the PMMA film was placed thereon and was subsequently irradiated with UV rays of light. At this time, the cured material of the particulate-matter-mixed composition in the light diffusion film had a thickness of 100 µm. Thereafter, using a PMMA cast plate ("PARAGLAS" manufactured by and available from Kuraray Co., Ltd. of Japan) of 90×70 mm in size and having a thickness of 0.8 mm as a light guide plate, vertexes of the light diffusion film were bonded to the light guide plate by the use of a UV bonding agent ("UVX4332" manufactured by and available from Toagosei Co., Ltd. of Japan). Finally, five white LEDs ("NACW008" manufactured by and available from Nichia Corporation of Japan) were arranged in a corner region of an end face of the light guide plate to thereby complete a planar light source element.

A direct current of 30 mA was applied to the LEDs of the planar light source element of thus obtained, to cause the planar light source element to emit rays of light. Using a luminance calorimeter ("BM-7A" manufactured by and available from Topcon Corporation of Japan), the front brightness at a center portion of the planar light source element was measured, the result of which was 1,150 cd/m$^2$. Also, the viewing angle of light emitted from the planar light source element was evaluated by measuring change in brightness relative to the inclined angles when the planar light source element was inclined upwards and downwards and left and right. The evaluation revealed that the planar light source element had viewing angles of 46 and 44 degrees. It is to be noted that the viewing angle of the emitted light is defined as half value width relative to the peak brightness.

EXAMPLE II

A particulate-matter-mixed composition was prepared by mixing 90 parts by weight of a photocurable compound ("VN-2", an acrylic compound manufactured by and available from Toagosei Co., Ltd. of Japan), 2.5 parts by weight of a particulate matter A ("TM-X-1" manufactured by and available from Toagosei Co., Ltd. of Japan) and 7.5 parts by weight of a particulate matter B ("TM-X-5" manufactured by and available from Toagosei Co., Ltd. of Japan), both prepared from PMMA, were mixed together to provide the particulate-matter-mixed composition. A cured material of the photocurable compound, the particulate matter A, and the particulate matter B had reflective indexes of 1.581, 1.497 and 1.497, respectively, and the particulate matters A and B represented a spherical shape having diameters of 2.4 µm and 5.4 µm, respectively.

Subsequently, was prepared a light diffusion film by forming a plurality of projections of a generally semispherical shape having a height of about 20 µm and a width of about 25 µm, in a PMMA film ("Technolloy S001" manufactured by and available from Sumitomo Chemical Co., Ltd. of Japan) of 80×60 mm in size and having a thickness of 0.13 mm. More concretely, the light diffusion film can be obtained by a process described hereinafter. That is, using a nickel stamper having a pattern of indentations that are complemental to the shape of the projections in the eventually formed light diffusion film, the particulate-matter-mixed composition referred to above has been filled in the nickel stamper, the PMMA film was placed thereon and was subsequently irradiated with UV rays of light. At this time, the cured material of the particulate-matter-mixed composition in the light diffusion film had a thickness of 100 µm. Thereafter, using a PMMA cast plate ("PARAGLAS" manufactured by and available from Kuraray Co., Ltd. of Japan) of 90×70 mm in size and having a thickness of 0.8 mm as a light guide plate, vertexes of the light diffusion film were bonded to the light guide plate by the use of a UV bonding agent ("UVX4332" manufactured by and available from Toagosei Co., Ltd. of Japan). Finally, five white LEDs ("NACW008" manufactured by and available from Nichia Corporation of Japan) were arranged in a corner region of an end face of the light guide plate to thereby complete a planar light source element.

A direct current of 30 mA was applied to the LEDs of the planar light source element of thus obtained, to cause the planar light source element to emit rays of light. Using a luminance calorimeter ("BM-7A" manufactured by and available from Topcon Corporation of Japan), the front brightness at a center portion of the planar light source element was measured, the result of which was 800 cd/m$^2$. Also, the viewing angle of light emitted from the planar light source element was evaluated by measuring change in brightness relative to the inclined angles when the planar light source element was inclined upwards and downwards and left and right. The evaluation revealed that the planar light source element had viewing angles of 55 and 56 degrees.

COMPARATIVE EXAMPLE I

A planer light source element was prepared in a manner similar to that in Example 1, but in place of the use of the particulate-matter-mixed composition used during the preparation of the light diffusion film in Example I, the photocurable compound ("UVX4370") was employed.

A direct current of 30 mA was applied to the LEDs of thus obtained planar light source element to cause the planar light source element to emit rays of light. Using the luminance colorimeter, the front brightness at a center portion of the planar light source element was measured, the result of which was 2,300 cd/m$^2$. Also, the viewing angle of light emitted from the planar light source element was evaluated by measuring change in brightness relative to the inclined angles when the planar light source element was inclined upwards and downwards and left and right. The evaluation revealed that the planar light source element had viewing angles of 29 and 30 degrees.

Examining the light emission exhibited by each of the planar light source elements obtained under Examples I and II, respectively, it has been ascertained that uniform planar light emission was obtained with no glare. Also, when a liquid crystal display panel was placed above any one of those planar light source elements and image information was then displayed, it has been visually ascertained that the satisfactory characters and images could be displayed with no irregular color appearing on the planar light source element. Yet, even though an observer moves up and down, left and right, there was little unpleasant sensation to the light emission from the planar light source element.

On the other hand, examining the light emission from the planar light source element obtained under Comparative Example I, it has been ascertained that not only was the viewing angle limited to a small value, but glare appeared on the planar light source element. It has also been ascertained that when an observer slightly moves from the front of the planer light source element, the brightness dropped considerably.

What is claimed is:

1. A planar light source element which comprises:
   a light guide plate comprising a top surface, a bottom surface and edges between the top surface and the bottom surface,
   one or more light sources provided at one or more edges of the light guide plate, and
   a light diffusion film positioned on the top surface of the light guide plate comprising:
   a sheet body having a first major surface on a light incident side and a second major surface on a light emissive side; and
   a plurality of projections protruding outwardly from the first major surface of the sheet body, the projections having inclined surfaces relative to the first major surface of the sheet body and vertexes lying on the same plane;
   wherein
   the top surface of the light guide plate is in contact with the vertexes of the projections of the light diffusion film, and is operable to emit rays of light, incident on the edge of the light guide plate, to the vertexes of the projections;
   the light diffusion film is operable to emit rays of light, incident on the vertexes of the projections and then reflected by the inclined surfaces of the projections, outwardly from the second major surface of the sheet body, which is opposite to the first major surface having the projections formed thereon;
   at least the projections are at least partially formed from a particulate-matter-dispersed composition including a photocurable compound and a particulate matter, wherein rays of light entering into the vertexes of the projections are scattered within the projections by the particulate matter present in the projections;
   wherein the particulate matter in the particulate-matter-dispersed composition has an average particle size within the range of 1 to 10 µm; and
   wherein the difference in refractive index between a cured matter formed from the photocurable compound and the particulate matter, both contained in the particulate-matter-dispersed composition, is within the range of 0.03 to 0.18, and
   wherein the light guide plate and the vertexes of the projections of the light diffusion film are bonded together.

2. The planar light source element as claimed in claim 1, wherein the projections and a part of the sheet body are formed from the particulate-matter-dispersed composition.

3. A liquid crystal display device utilizing the planar light source element as set forth in claim 1.

4. The planar light source element as claimed in claim 1, wherein the particulate matter comprises at least one selected from the group consisting of a methacrylic polymer, a styrene-methacrylate copolymer, a polystyrene, a polyacrylonitrile, a polyester, a silicone, an epoxy resin, a melamine resin, barium sulfate, calcium carbonate, aluminum hydroxide, titanium dioxide, silica, alumina, glass, and combinations thereof.

5. The planar light source element as claimed in claim 4, wherein the particulate matter comprises the methacrylic polymer.

6. The planar light source element as claimed in claim 4, wherein the particulate matter comprises the styrene-methacrylate copolymer.

7. The planar light source element as claimed in claim 4, wherein the particulate matter comprises the polystyrene.

8. The planar light source element as claimed in claim 4, wherein the particulate matter comprises the polyacrylonitrile.

9. The planar light source element as claimed in claim 4, wherein the particulate matter comprises the polyester.

10. The planar light source element as claimed in claim 4, wherein the particulate matter comprises the silicone.

11. The planar light source element as claimed in claim 4, wherein the particulate matter comprises the epoxy resin.

12. The planar light source element as claimed in claim 4, wherein the particulate matter comprises the melamine resin.

13. The planar light source element as claimed in claim 4, wherein the particulate matter comprises the barium sulfate.

14. The planar light source element as claimed in claim 1, wherein the particulate matter comprises at least one selected from the group consisting of a methacrylic polymer, a styrene-methacrylate copolymer, and combinations thereof;
   wherein the methacrylic polymer comprises methyl methacrylate as a main component, and
   wherein the styrene-methacrylate copolymer comprises methyl methacrylate and styrene as main components.

15. A light diffusion film comprising:
   a sheet body having a first major surface on a light incident side and a second major surface on a light emissive side, and
   a plurality of projections protruding outwardly from the first major surface of the sheet body, the projections having inclined surfaces relative to the first major surface of the sheet body and vertexes lying on the same plane;
   wherein the light diffusion film is operable to emit rays of light, incident on the vertexes of the projections and then reflected by the inclined surfaces of the projections, outwardly from the second major surface of the body sheet, which is opposite to the first major surface having the projections formed thereon;
   wherein at least the projections are at least partially formed from a particulate-matter-dispersed composition comprising a photocurable compound and a particulate matter, wherein rays of light entering into the vertexes of the projections are scattered within the projections by the particulate matter present in the projections;
   wherein the particulate matter in the particulate-matter-dispersed composition has an average particle size within the range of 1 to 10 µm; and
   wherein the difference in refractive index between a cured matter formed from the photocurable compound and the particulate matter, both contained in the particulate-matter-dispersed composition, is within the range of 0.03 to 0.18; and
   wherein the particulate matter comprises at least one selected from the group consisting of a methacrylic polymer, a styrene-methacrylate copolymer, a polystyrene, a polyacrylonitrile, a polyester, a silicone, an epoxy resin, a melamine resin, barium sulfate, calcium carbonate, aluminum hydroxide, titanium dioxide, silica, alumina, glass, and combinations thereof.

16. The light diffusion film as claimed in claim 15, wherein the particulate matter comprises at least one selected from the group consisting of the methacrylic polymer, the styrene-methacrylate copolymer, and combinations thereof;
   wherein the methacrylic polymer comprises methyl methacrylate as a main component, and
   wherein the styrene-methyacrylate copolymer comprises methyl methacrylate and styrene as main components.

* * * * *

UNITED STATES PATENT AND TRADEMARK OFFICE
CERTIFICATE OF CORRECTION

| | | |
|---|---|---|
| PATENT NO. | : 7,967,492 B2 | Page 1 of 1 |
| APPLICATION NO. | : 11/817162 | |
| DATED | : June 28, 2011 | |
| INVENTOR(S) | : Atsushi Nagasawa et al. | |

It is certified that error appears in the above-identified patent and that said Letters Patent is hereby corrected as shown below:

On the title page, Item (86), the Application Filing Date is incorrect. Item (86) should read:

-- (86)  PCT No.:  PCT/JP2006/303603

§ 371 (c)(1),
(2), (4) Date:  Aug. 27, 2007 --

Signed and Sealed this
Sixteenth Day of August, 2011

David J. Kappos
*Director of the United States Patent and Trademark Office*